Aug. 13, 1957 F. E. ROMMEL 2,802,903

TELEPHONE SYSTEM AND APPARATUS

Filed Sept. 7, 1954

INVENTOR
Frederick Emil Rommel
by Pierce, Scheffler & Parker
ATTORNEYS

United States Patent Office 2,802,903 Patented Aug. 13, 1957

2,802,903

TELEPHONE SYSTEM AND APPARATUS

Frederick Emil Rommel, Ilford, England, assignor to Telephone Manufacturing Company Limited, London, England Application September 7, 1954, Serial No. 454,479

Claims priority, application Great Britain September 11, 1953

5 Claims. (Cl. 179—22)

Figures 1, 2:
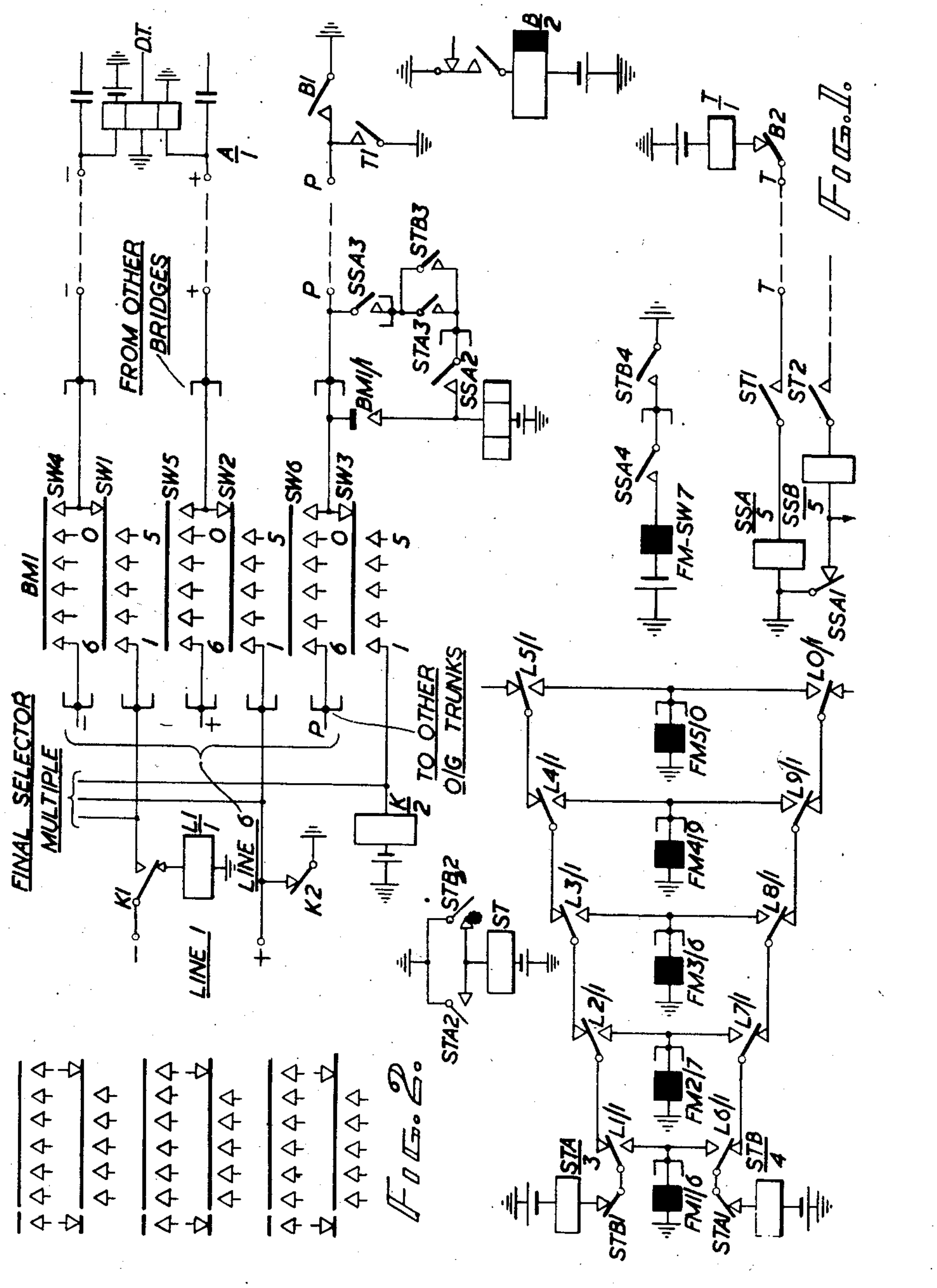

This invention relates to telephone and like systems and to apparatus used therein. The invention is particularly suitable for use in automatic telephone systems and apparatus.

In a telephone system of the crossbar type use may be made of a crossbar switch; such a switch includes a plurality of contact sets, a preselector or so-called finger magnet pertaining to a group of several contact sets and a number of main operating or so-called bridge magnets. The arrangement is such that a bridge magnet, upon energisation, operates only that contact set of which the corresponding finger magnet is energised at the time of operation of the bridge magnet.

In the present invention use is made of a selective relay including a plurality of contact sets, a finger magnet pertaining to each contact set, and a bridge magnet. The operation is such that the bridge magnet upon energisation operates only that contact set of which the finger magnet is energised at the time of operation of the bridge magnet. It is convenient to call such a selective relay simply a "bridge"; an example of a bridge of this type is shown and described in our co-pending applications Nos. 451,374 and 451,375 of August 23, 1954, and as generally described in U. S. Patent 2,630,500.

The mechanical features of the bridge by which the preselection is obtained vary considerably, but in most cases involve a member, which is identified in our prior applications as an interference piece, carried by each finger magnet armature and moved upon operation of the finger magnet so as to be interposed between the armature of the main magnet and a part which operates the contacts, so as to act as a mechanical coupling. In a switching system using a bridge of this type, the bridge is used to select one of as many outlet circuits as there are contact sets. In a practical telephone system, the capacity of the system is always in excess of the capacity of a single bridge, and it becomes necessary to use a substantial number of such bridges to obtain the desired capacity. In crossbar systems which have been proposed the crossbar switches comprise a relatively large number of contact sets, say 100 to provide 100 outlets. The contact sets are grouped in ten columns and ten rows, with ten main bridge magnets, pertaining one to each row of contacts and ten finger magnets pertaining one to each column. In this case, however, each finger magnet carries ten interference pieces, one for each contact set of the row. Because of this, each finger magnet has to operate a bar, extending across the switch.

In the arrangement to which this invention can be applied as many of the bridges are used as is required to obtain the desired number of outlets, say 100, and the combination is effected solely by electrical interwiring. Thus, with fiive contact sets per bridge, as described above, there will be twenty bridges, with five finger magnets and one bridge magnet in each switch. By connecting finger magnets in parallel in groups of ten, and the bridge magnets in parallel in pairs, it will be readily seen that there can be obtained the electrical equivalent of the mechanically coupled crossbar switch.

In order to double the capacity of the crossbar switch it has been proposed to resort to what is known as "level switching." In this level switching arrangement each finger magnet is associated with twice the number of contact sets, of which two are operated instead of the one when the bridge magnet is energised, and which outlet is selected is determined by a preselector circuit. For example, the contact set associated with each finger magnet can in effect have a greater number of contacts, divided into two groups (or "levels") and one or other of the groups can be selected by an auxiliary relay. In another crossbar switch arrangement in effect twice the number of finger magnets, each with its contact set, are used and the finger magnet circuits are preselected. The increased capacity, and hence economy, which is obtained by level switching is purchased at the price of a certain loss of facility, but this is known, and the invention is not concerned with this point.

The present invention is concerned with level switching arrangements for bridges of the type described. This alternative type of system involves more finger magnets than that first described; it has certain marked advantages; it is easier to maintain, and in particular is considerably easier to expand the system to increase its capacity. Overall, despite the increased number of finger magnets used with such bridges, the two systems are competitive with suitable engineering design. The relay described and shown in our two prior specifications referred to is particularly suitable in this respect.

In accordance with the present invention in a switching system using switching bridges, level switching is effected by employing two groups of contacts for each finger magnet, and a further finger magnet, for level switching, for selecting one or other of the two groups. If the level switching finger magnet contact set itself has two groups of contacts, one comprising "break" contacts and one comprising "make" contacts, it then becomes possible to use a common contact element, such as a single metal stamping, for corresponding contacts of different sets, thus avoiding a separate wiring connection for the level switching.

The invention will be further described in relation to one embodiment thereof, in conjunction with the accompanying drawings, in which:

Figure 1 is a simplified circuit diagram of exchange equipment for an automatic telephone system employing the invention, and Figure 2 is a diagram of the contacts of one of the bridges.

Figure 1 shows the preselecting circuits by which a subscriber can obtain access to a number of trunks. The circuit which is shown in the drawing is similar in some respects to that shown and described in U. S. Patent No. 2,704,786 and to which attention is directed, but modified to include the present invention.

In the circuit arrangement shown in the drawing, one subscriber's line, one bridge magnet and one outgoing trunk are indicated, and in addition certain elements of the subsequent switching stage are also shown. The bridge contacts and the finger magnets are indicated using the same convention as that of specification No. 686,751; the bridge BM1 has six common contacts indicated by a darker line, with which are associated seven contacts, providing switches numbered SW1 to SW6. The contacts of each switch are numbered 1 to 5 (in the odd numbered switches) and 6 to 0 (in the even numbered switches). Associated with the column of contacts 1 and 6, 2 and 7, etc. up to 5 and 0 are five finger magnets FM1/6 to FM5/0 and a sixth finger magnet FM-SW7. The main operating magnet of the bridge is coil BM1.

The operation of the contacts 1 to 5 and 6 to 0 in response to energising of the appropriate finger magnets and main magnet is as described above and in the prior specifications and will not be further described here. As is shown in Figure 2, all these contacts are "make" contacts. The sixth column of contacts is operated like the others, in response to energisation of its finger magnet FM–SW7 and the main magnet BM1 but half of its contacts are "make" and half "break," as shown in Figure 2.

A seventh column of contacts on the bridge, electrically independent of the six columns shown, provide the off-normal contacts. These contacts, as described in U. S. applications 451,374 and 451,375, are operated on each energisation of the bridge magnet and require no pertaining finger magnet. In the present embodiment only one such off-normal contact is required, and this is shown separately at BM1/1, but the relay is provided with six such contacts, some "make," some "break," as shown in Figure 2. It may also be that in practice a bridge may have more or less than the six rows of contacts shown.

As will be readily seen from Figure 1, the subscriber's line and private wire P are connected to the contacts 1 on three levels of the bridge; similarly each subscriber up to the tenth is connected to the corresponding contacts. The outlets from the bridge, on the —, + and P wires are multipled, as indicated, to the corresponding outlets from the other bridges used.

When the subscriber on line 1 initiates a call, the loop across the line causes relay L1 to operate over contacts K1, K2. Contacts L1/1 operate and, over contacts STB1, thereby energise all the finger magnets FM1/6 of all the bridges, which are multipled as shown, and also the preselector start relay STA. Contacts L1/1 also disable all the circuits of the succeeding finger magnets FM2/7 to FM5/0 of subscribers 2–5. It is to be observed that with this arrangement the lowest number line has priority and holds the preselector until the connection is completed, but it can be arranged otherwise if desired.

When start relay STA operates, its contacts STA1 disable the circuit of start relay STB and the circuits of the finger magnets FM2/7 to FM5/0 of subscribers 6 to 10.

Contacts STA2 complete the circuit of trunk searcher start relay ST which operates, and contacts STA3 prepare a circuit for the bridge magnet BM1. When trunk searcher start relay ST operates, contacts ST1, ST2, etc. connect the test wires of trunks 1, 2, etc. to the preselector trunk test relay SSA, SSB, etc. In the idle condition each trunk test wire is connected to battery—over the connector test relay T and contacts B2. Contacts ST1 accordingly complete the circuit of relays SSA and T at both ends of the test wire. Contacts SSA1 open, and thereby disable the circuits of the successive preselector trunk test relays. Contacts T1 close and put ground on the P wire, and bridge magnet BM1 is energised over contacts SSA2, STA3 and SSA3 and locks to the holding circuit over the off-normal contacts BM1. The corresponding circuits of the other bridges are multipled as shown.

Since the finger magnet pertaining to the subscriber had already been positioned by operation of the subscriber's L1 relay as described above, the operation of the bridge magnet closes the contacts of column 1 to extend the calling line through to the switching stage via the unoperated level switching contacts, SW1, SW2, SW3. The subscriber's cut-off relay K operates over contacts 1 and SW3 of the bridge, to the ground condition on the P wires and the subscriber's L1 relay releases at contacts K1 and K2. The subscriber's line is now extended through the bridge contacts to the — and + wires to the transmission bridge of the connector. The A relay operates over the subscriber's loop circuit, and its contacts A1 complete the circuit of guard relay B. In turn, the contacts B1 of this relay puts a further ground connection on the P wire and the contacts B2 open the test wire, and thus cause relays T and SSA to release. The release of the subscriber's line relay L1 also causes the release of relay STA, and hence finger magnet FM1/6 and relay ST. At this stage, therefore, the preselector is available for use by other subscribers.

The operation for a subscriber on lines L2 to L5 is so nearly the same as not to warrant further description. For subscribers on line 6 to 10 the operation is very similar except that relay STB will operate instead of STA, and cause the operation of finger magnet FM–SW7 to effect level switching. From the drawing it is clear that if line 6 calls, in this case the same finger magnet FM1/6 operates as for line 1 and the remaining circuit operation will be substantially as described except that when the bridge magnet BM1 operates the level switching column of contacts will be operated as well as the line column of contacts. The calling line is then extended to the switching stage over contacts SW4, SW5 and SW6.

When the subscriber hangs up, relay A releases, followed by B, followed by K and BM1 and the system reverts to normal.

It will be appreciated that by combining the level switching and off-normal contacts structurally with the contact bank of the bridge the manufacture of such systems will be facilitated and the circuit appreciably simplified. The auxiliary level switching relay is dispensed with, and it is replaced by the relatively small additional finger magnet and contact set in the bridge bank, the increase of power required to operate the bridge magnet being negligible. The wiring of such circuits is also considerably simplified, because all common contacts in any bridge are provided integrally and external wiring for this purpose is obviated.

I claim:

1. A selective electromagnetic bridge including a series of contact sets, a finger magnet pertaining to each contact set, a main operating magnet, means associated with each finger magnet for causing operation, upon energization of the main magnet, of only those contacts of which the pertaining finger magnet has previously been energized, and means arranging one of said finger magnets and its pertaining contacts to effect level switching in others of said contact sets.

2. A selective electromagnetic bridge including a series of contact sets, a finger magnet pertaining to each set, and a further contact set, a main operating magnet, means associated with each finger magnet for causing operation, upon energization of the main magnet, of only those of the series of contact sets of which the pertaining finger magnet has been energized, and means for operating said further contact set upon each operation of said main magnet, and means arranging one of said finger magnets and its pertaining contacts to effect level switching in other of the series of contact sets, wherein the contacts of said further set are used for off-normal contacts.

3. A bridge in accordance with claim 1, and comprising a plurality of integrally formed contact carrying members common to said series of sets, the contacts on said members and other contacts of the sets providing, in the level switching set, some "make" and some "break" contacts and "make" contacts in the other sets of the said series.

4. A selective electromagnetic bridge comprising a series of contact sets, each set comprising a plurality of "make" contacts having both fixed and moving contacts, a finger magnet pertaining to each contact set, a main operating magnet, means associated with each finger magnet for causing operation, upon energization of the main magnet, of only those contacts of which the pertaining finger magnet has previously been energized, and means arranging additional contact sets, comprising mixed "make" and "break" contacts, at least one of said additional contact sets having a pertaining finger magnet, and means associated therewith for causing operation of the contact set when the main magnet is energized and at least one other of said mixed contact sets having means for causing operation of the contact set upon each operation of the main magnet.

5. A bridge according to claim 4, wherein the contact sets of each of said series of "make" contact sets are divided into two or more groups or levels and the fixed contacts of each "make" action of the series are connected to provide at least one common contact member for each group or level and wherein connection to said common contact member is provided in one group via further moving "break" contacts and, in the other group, via further moving "make" contacts, said further moving "make" and "break" contacts comprising a contact set selectively operable by means associated with a pertaining finger magnet when the main operating magnet is energized.

References Cited in the file of this patent

UNITED STATES PATENTS

| | | |
|---|---|---|
| 2,396,077 | Blackhall | Mar. 5, 1946 |
| 2,573,889 | Boswau | Nov. 6, 1951 |